Mar. 20, 1923.
H. R. LECHNER
VALVE
Filed Dec. 14, 1920    3 sheets-sheet 1
1,449,337
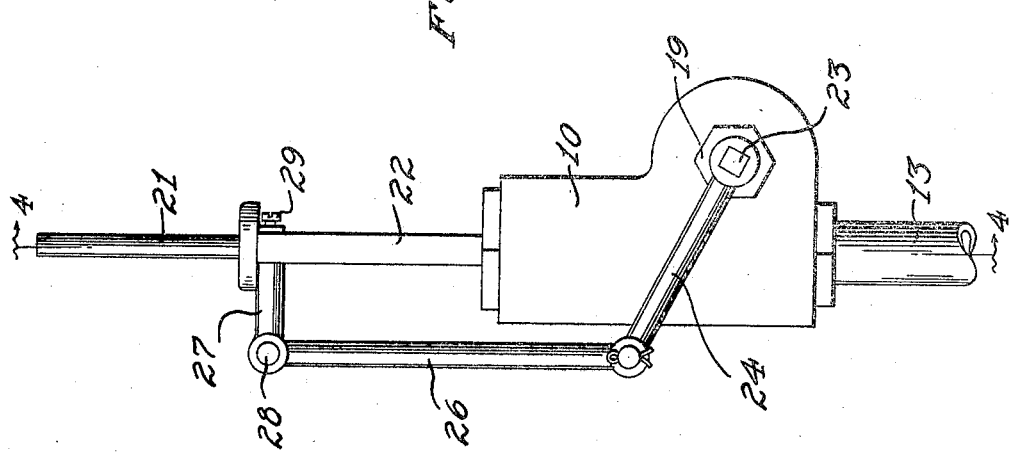
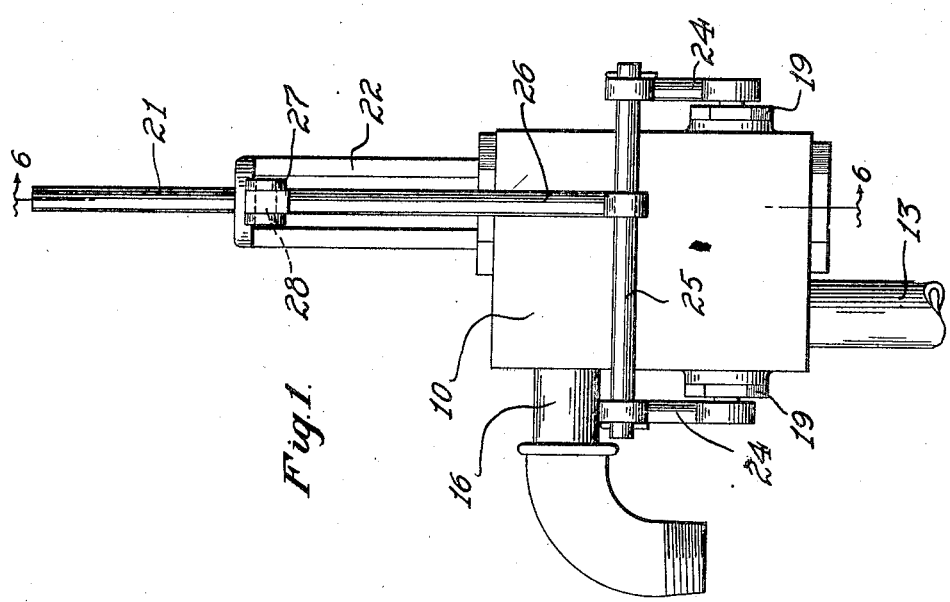
Herman R. Lechner.
INVENTOR

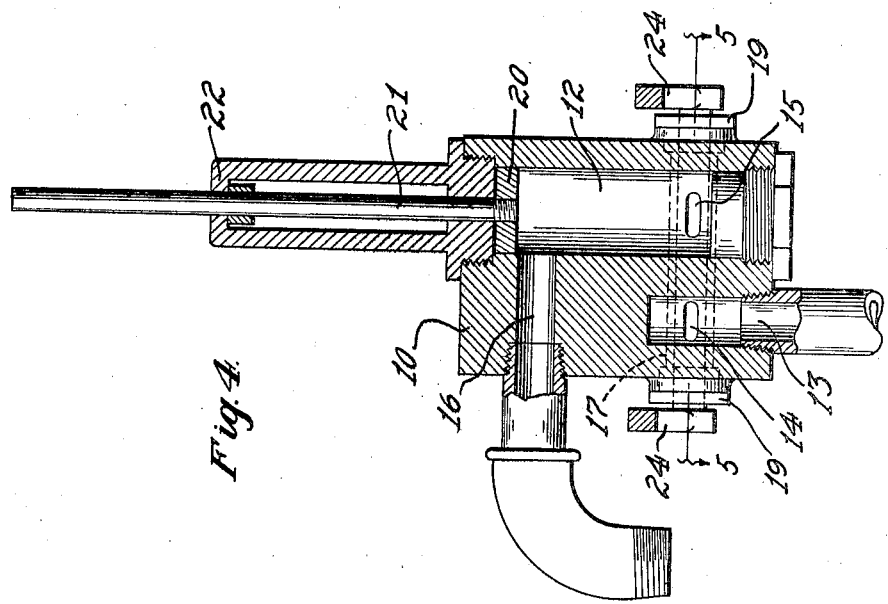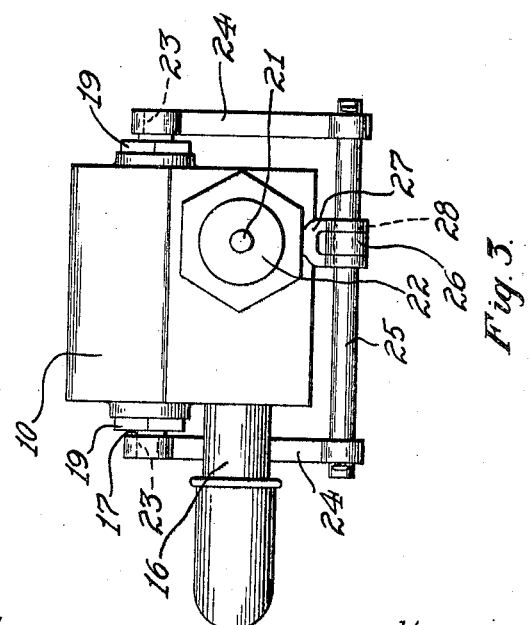

Mar. 20, 1923.
H. R. LECHNER
VALVE
Filed Dec. 14, 1920
1,449,337
3 sheets-sheet 3
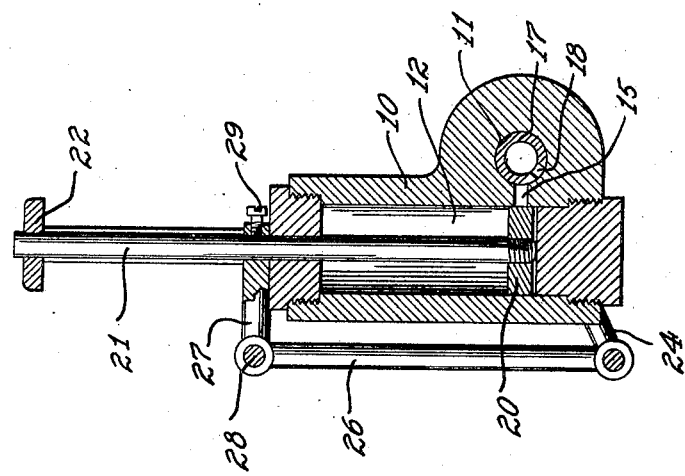
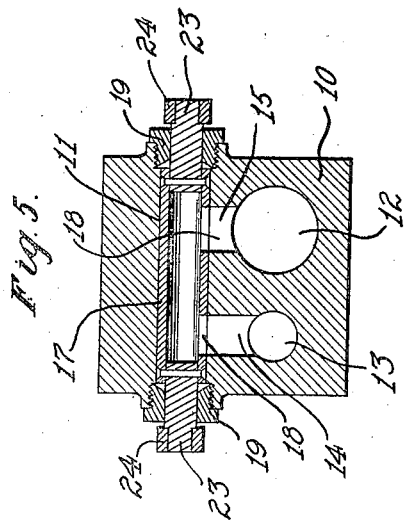
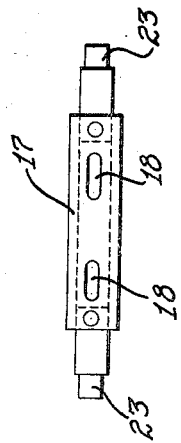
Herman R. Lechner.
INVENTOR Patented Mar. 20, 1923.

1,449,337

UNITED STATES PATENT OFFICE.

HERMAN R. LECHNER, OF SHREVEPORT, LOUISIANA.

VALVE.

Application filed December 14, 1920. Serial No. 430,651.

*To all whom it may concern:*

Be it known that I, HERMAN R. LECHNER, a citizen of the United States, residing at Shreveport, in the parish of Caddo and State of Louisiana, have invented new and useful Improvements in Valves, of which the following is a specification.

This invention relates to improvements in valves and has for an object the provision of a valve especially adapted for use in gas lines and which will be automatically closed when pressure through the line is relieved, but which must be manually opened.

Another object is the provision of a valve of this character which is positive and reliable in operation and which will reduce danger of accident at cutting off the flow of gas and then restoring said flow without proper notification.

A further object is the provision of a valve which must be manually opened, but will be maintained in an open position by pressure of gas therethrough, being automatically closed as soon as the pressure is cut off, so that the mere restoration of pressure will not open the valve.

With the above and other objects in view, the invention further includes the following novel features and details of construction, to be hereinafter more fully described, illustrated in the accompanying drawings and pointed out in the appended claim.

In the drawings:—

Figure 1 is an elevation of a valve embodying the present invention.

Figure 2 is a similar view at right angles to Figure 1.

Figure 3 is a top plan view of the valve.

Figure 4 is a sectional view on the line 4—4 of Figure 2 showing the valve in open position.

Figure 5 is a horizontal sectional view on the line 5—5 of Figure 4.

Figure 6 is a sectional view on the line 6—6 of Figure 1 but showing the valve in closed position.

Figure 7 is a detail view of the main valve.

Referring specifically to the drawings, wherein like characters of reference denote corresponding parts, the invention as illustrated comprises a valve casing 10 which is formed with a main valve chamber 11 and an auxiliary valve chamber 12, the said valve chambers being disposed at right angles to one another. The main valve chamber 11 communicates with an inlet port 13 through the medium of an opening 14 and further communicates with the auxiliary valve chamber 12 through an opening 15 located at one end of the last mentioned valve chamber. The opposite end of this valve chamber 12 is in communication with an outlet port 16.

Operating within the valve chamber 11 is a rotary valve 17, of hollow cylindrical construction and which is provided with spaced ports 18 which are adapted to be moved into and out of register with the openings 14 and 15 for the purpose of establishing and cutting off communication between the ports 13 and 16. This rotary valve 17 is secured within the valve chamber 11 by means of packing nuts 19.

Operating within the valve chamber 12 is an auxiliary valve 20 which is of flat disklike formation and has a working fit within the cylindrical bore forming the chamber 12. Extending from the auxiliary valve 20 is a valve stem 21, which operates through a guide 22 extending from the casing 10.

Secured upon the opposite squared ends 23 of the valve 17 are arms 24, the outer ends of these arms being connected by a rod 25 so as to form a yoke. When this yoke is rocked, the valve 17 will have its ports moved into and out of engagement with the openings 14 and 15. Secured to the rod 25 is one end of a rod 26, the opposite end of this rod being pivotally connected to an arm 27, as shown at 28. The arm 27 has its inner end connected to the valve stem 21 by means of a set screw 29, so that the position of the arm 27 may be adjusted upon the valve stem.

In the operation of the invention, gas entering the valve casing through the port 13 will be prevented from escaping through the port 16 until the main valve 17 is manually operated to bring the ports 18 into register with the openings 14 and 15. The act of opening the main valve 17, will, through its connection with the valve stem 21, raise the auxiliary valve 20 to the position shown in Figure 4 so that communication is established between the ports 13 and 16. Pressure is thus maintained within the auxiliary valve chamber 12 and the said auxiliary valve will be maintained by this pressure in the position to prevent accidental closing of the main valve.

Should however, the pressure within the auxiliary valve chamber 12 be relieved by any interference with the flow of gas inward through the port 13, the weight of the auxiliary valve will cause the latter to close, that is, to move to the opposite end of the chamber 12 or to the position shown in Figure 6. This movement of the auxiliary valve will through its connections with the main valve rotate the latter to move the ports 18 out of register with the openings 14 and 15, whereupon the valve will be closed. The proper degree of movement of the valve 17 may be regulated by adjusting the arm 27 upon the valve stem 21. After the valve has been closed, it may be opened only by manual manipulation.

It will be seen from the foregoing description and the accompanying drawings, that the invention provides an automatically operated valve which is controlled by pressure passing therethrough, so that as soon as pressure is relieved the valve will be closed and may only be opened by its manual manipulation, thereby rendering it especially desirable for use in controlling the flow of gas.

The invention is susceptible of various changes in its form, proportions and minor details of construction and the right is herein reserved to make such changes as properly fall within the scope of the appended claim.

Having described the invention what is claimed is:—

A valve of the character described comprising a casing having a main chamber provided with an inlet port and an auxiliary chamber provided with an outlet port, said chambers being disposed at right angles to one another, a rotary valve of hollow cylindrical formation and being provided with spaced ports to establish and cut off communication between the inlet port and the outlet port of the respective chambers, an auxiliary valve being of flat disk-like formation and having a working fit within the cylindrical bore forming the auxiliary chamber, a guide extending from the casing and being aligned with the auxiliary chamber, a stem having one end secured to the auxiliary valve and adapted to be slidably mounted in said guide, an arm secured to each end of said rotary valve, a rod connecting the arms at their free ends, an arm adjustably secured to the stem, and a rod pivotally secured to the first mentioned rod and the adjustably secured arm as and for the purpose specified.

In testimony whereof I affix my signature.

HERMAN R. LECHNER.